(12) United States Patent
Kachman et al.

(10) Patent No.: US 11,934,479 B2
(45) Date of Patent: Mar. 19, 2024

(54) QUANTUM SPARSE FOURIER TRANSFORM

(71) Applicant: INTERNATIONAL BUSINESS MACHINES CORPORATION, Armonk, NY (US)

(72) Inventors: Tal Kachman, Haifa (IS); Mark S. Squillante, Greenwich, CT (US); Lior Horesh, North Salem, NY (US); Kenneth Lee Clarkson, Madison, NY (US); John A. Gunnels, Somers, NY (US); Ismail Yunus Akhalwaya, Emmarentia (SA); Jayram Thathachar, Morgan Hill, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 773 days.

(21) Appl. No.: 17/065,277

(22) Filed: Oct. 7, 2020

(65) Prior Publication Data

US 2022/0107989 A1 Apr. 7, 2022

(51) Int. Cl.
*G06F 17/14* (2006.01)
*G06N 10/00* (2022.01)

(52) U.S. Cl.
CPC .......... *G06F 17/141* (2013.01); *G06N 10/00* (2019.01)

(58) Field of Classification Search
CPC .............................. G06F 17/141; G06N 10/00
See application file for complete search history.

(56) References Cited

U.S. PATENT DOCUMENTS

| 9,665,539 B1 | 5/2017 | Macready et al. | |
| 2014/0187427 A1 | 7/2014 | Macready et al. | |
| 2014/0211039 A1* | 7/2014 | Herman | H04N 19/90 348/222.1 |
| 2014/0297708 A1* | 10/2014 | Svore | G06N 10/00 708/517 |
| 2018/0196780 A1 | 7/2018 | Amin et al. | |
| 2018/0300286 A1 | 10/2018 | Raymond | |

OTHER PUBLICATIONS

Barenco et al. "Approximate quantum Fourier transform and decoherence." Physical Review A, 54,1 (1996): 139.

(Continued)

*Primary Examiner* — Michael D. Yaary
(74) *Attorney, Agent, or Firm* — Amin, Turocy & Watson, LLP (57) ABSTRACT

A method for performing sparse quantum Fourier transform computation includes defining a set of quantum circuits, each quantum circuit comprising a Hadamard gate and a single frequency rotation operator, said set of quantum circuits being equivalent to a quantum Fourier transform circuit. The method includes constructing a subset of said quantum circuits in a quantum processor, said quantum processor having a quantum representation of a classical distribution loaded into a quantum state of said quantum processor. The method includes executing said subset of said quantum circuits on said quantum state, and performing a measurement in a frequency basis to obtain a frequency distribution corresponding to said quantum state.

20 Claims, 4 Drawing Sheets

(56) References Cited

OTHER PUBLICATIONS

Shelton, "Consensus Model of Families of Images using Tensor-based Fourier Analysis." Diss, East Tennessee State University (2016).

Terraneo et al., "Quantum computation and analysis of Wigner and Husimi functions: toward a quantum image treatment." Physical Review E 71.6 (2005): 066215.

Rossini, "Quantum Information Processing and Quantum Spin Systems" Diss, Scuola Normale Superiore, (2007).

Hassanieh, H., Indyk, P., Katabi, D. and Price, E., May 2012. Nearly optimal sparse Fourier transform. In Proceedings of the forty-fourth annual ACM symposium on Theory of computing(pp. 563-578). ACM. Quantum.

Gilbert, A.C., Guha, S., Indyk, P., Muthukrishnan, S. and Strauss, M., May 2002. Near-optimal sparse Fourier representations via sampling. In Proceedings of the thiry-fourth annual ACM symposium on Theory of computing (pp. 152-161).

Chiaverini, J.A., Britton, J., Leibfried, D., Knill, E., Barrett, M.D., Blakestad, R.B., Itano, W.M., Jost, J.D., Langer, C., Ozeri, R. and Schaetz, T., 2005. Implementation of the semiclassical quantum Fourier transform in a scalable system. science, 308(5724), pp. 997-1000.

Takahashi, Y., Kunihiro, N. and Ohta, K., 2007. The quantum fourier transform on a linear nearest neighbor architecture. Quantum Information & Computation, 7(4), pp. 383-391.

\* cited by examiner

QUANTUM SPARSE FOURIER TRANSFORM

This invention was made with Government support under Contract No.: FAF875918C0098 awarded by AFRL (US Air Force). The Government has certain rights in this invention.

BACKGROUND

The presently claimed embodiments of the current invention relate to Fourier transform computation using quantum systems, and more specifically, to methods and systems for performing sparse quantum Fourier transform (SQFT) computation.

The quantum Fourier transform is of fundamental importance and represents a key ingredient in most quantum algorithms today. It has broad applications and practical usage, from quantum phase estimation, ground state calculations, signal processing to time series analysis and quantum machine learning and convolution neural networks.

The observation that the single qubit Hadamard gate (used universally) is the exact QFT of a single qubit, while the tensored Hadamard gate on multiple qubits is the first order (depth 1) approximation of the Fourier transform indicates that a better understanding of the Fourier transform and its approximations can lead to improvements in quantum computing in general.

The quantum Fourier transform (QFT) can provide an exponential speed-up compared to the classical FFT by having a complexity of $O(n^2)$ where n is the number of gates in the circuit. Yet implementation of the quantum Fourier transform may impose computational and accuracy bottlenecks that render most algorithms hard to use or scale up.

While greatly improving on the classical version, it is still a hard problem to solve even in the quantum way. Thus, there is great gain in providing better and more efficient hardware to performing the quantum Fourier transform.

SUMMARY

According to an embodiment of the present invention, a method for performing sparse quantum Fourier transform computation includes defining a set of quantum circuits, each quantum circuit comprising a Hadamard gate and a single frequency rotation operator, the set of quantum circuits being equivalent to a quantum Fourier transform circuit. The method includes constructing a subset of the quantum circuits in a quantum processor, the quantum processor having a quantum representation of a classical distribution loaded into a quantum state of the quantum processor. The method includes executing the subset of the quantum circuits on the quantum state, and performing a measurement in a frequency basis to obtain a frequency distribution corresponding to the quantum state.

According to an embodiment of the present invention, a system for sparse Fourier transform computation includes a quantum processor and a classical computer. The classical computer is configured to define a set of quantum circuits, each quantum circuit comprising a Hadamard gate and a single frequency rotation operator, the set of quantum circuits being equivalent to a quantum Fourier transform circuit. The classical computer is configured to construct a subset of the quantum circuits in the quantum processor, the quantum processor having a quantum representation of a classical distribution loaded into a quantum state of the quantum processor. The classical computer is configured to receive from the quantum processor a frequency distribution corresponding to the quantum state.

According to an embodiment of the present invention, a computer-readable medium comprises computer-executable code which when read by a computer causes the computer to define a set of quantum circuits, each quantum circuit comprising a Hadamard gate and a single frequency rotation operator, the set of quantum circuits being equivalent to a quantum Fourier transform circuit. The computer-executable code when read by a computer causes the computer to construct a subset of the quantum circuits in the quantum processor, the quantum processor having a quantum representation of a classical distribution loaded into a quantum state of the quantum processor. The computer-executable code when read by a computer causes the computer to receive from the quantum processor a frequency distribution corresponding to the quantum state.

DETAILED DESCRIPTION

According to some embodiments of the present invention, short-depth QFT circuits for narrow-band and sparse QFT (SQFT) are provided. In the sparse case, the QFT competes with or greatly improves upon excellent classical techniques for the fast Fourier transform (FFT) of k-sparse signals, with $O(kn)$ complexity. The quantum Fourier transform (QFT) offers an exponential speed-up compared to the classical FFT by having a complexity of $O(\log(n)k)$ where n is the number of gates in the circuit.

Figure 1:
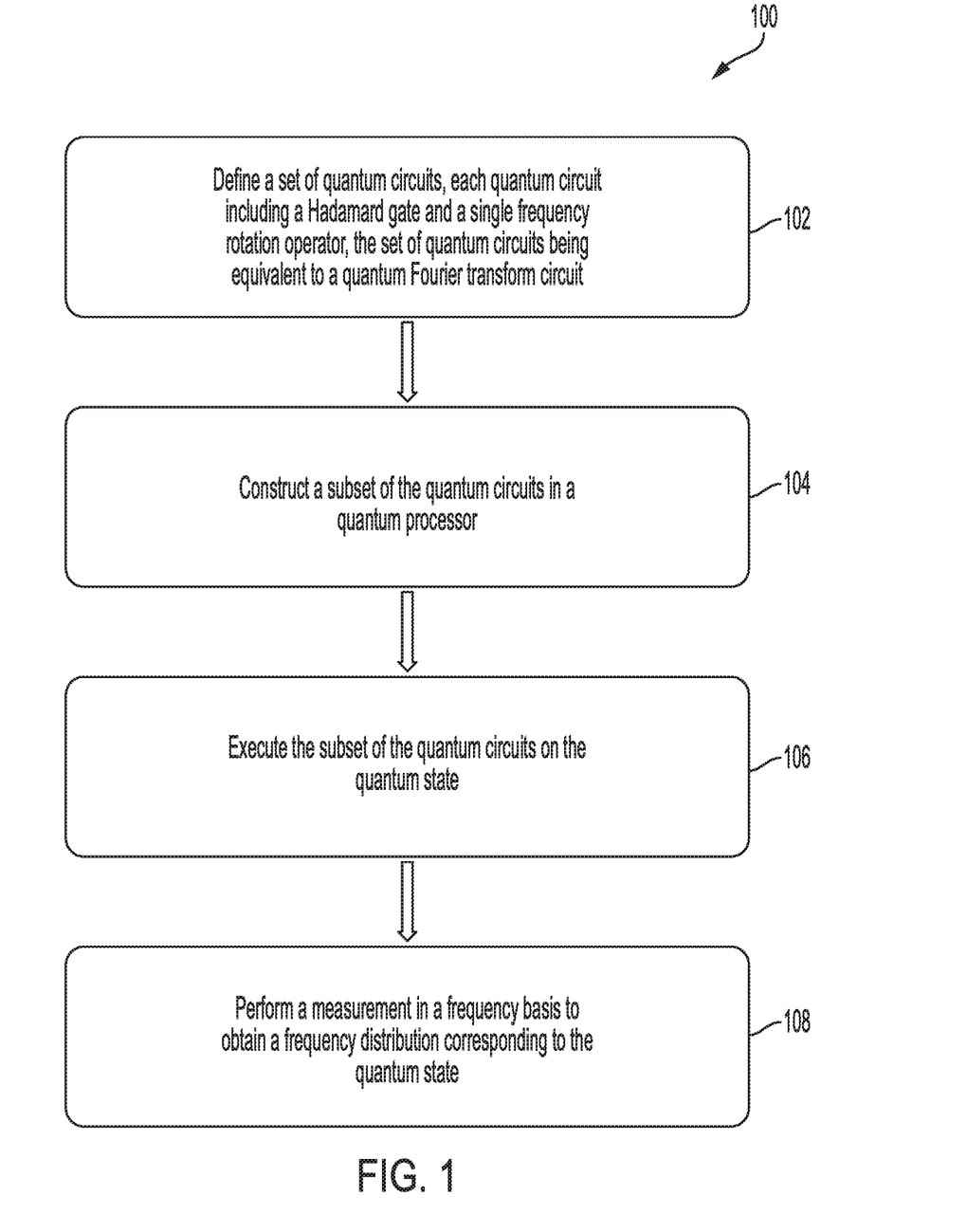
FIG. 1 is a flowchart that illustrates a method for performing sparse Fourier transform computation, according to an embodiment of the current invention.

FIG. 1 is a flowchart that illustrates a method 100 for performing sparse quantum Fourier transform (SQFT) computation, according to an embodiment of the current invention. The method 100 includes defining a set of quantum circuits, each quantum circuit comprising a Hadamard gate and a single frequency rotation operator, the set of quantum circuits being equivalent to a quantum Fourier transform circuit, at 102. The method includes constructing a subset of the quantum circuits in a quantum processor, at 104, the quantum processor having a quantum representation of a classical distribution loaded into a quantum state of the quantum processor. The method includes executing the subset of the quantum circuits on the quantum state, at 106. The method further includes performing a measurement in a frequency basis to obtain a frequency distribution corresponding to the quantum state, at 108.

According to an embodiment of the present invention, the method 100 further includes constructing a sparse quantum Fourier transform circuit based on the frequency distribution. According to an embodiment of the present invention, the single frequency rotation operator is a two-qubit rotation operator that depends on a separation between two qubits in the quantum state. According to an embodiment of the present invention, each quantum circuit of the set of quantum circuits includes a single frequency rotation operator that is different from the single frequency rotation operator of each other quantum circuit. According to an embodiment of the present invention, each quantum circuit of the subset of the quantum circuits provides an indication of a different frequency than each other quantum circuit of the subset of the quantum circuits upon measurement.

According to an embodiment of the present invention, the method 100 also includes loading the quantum representation of the classical distribution into the quantum state of the quantum processor. The embodiments of the invention are not limited to a particular method for loading the quantum representation of the classical distribution into the quantum state of the quantum processor. For example, methods are known for creating superpositions that correspond to efficiently integrable probability distributions. Alternatively, the quantum representation of the classical distribution may be loaded into the quantum state using a quantized inverse cumulative algorithm. The preparation circuit may be a series of Hadamard gates followed by a quantized version of the classical inverse cumulative function. Alternatively, the quantum representation of the classical distribution may be loaded into the quantum state using a Bayesian posterior distribution construction.

Figure 2:
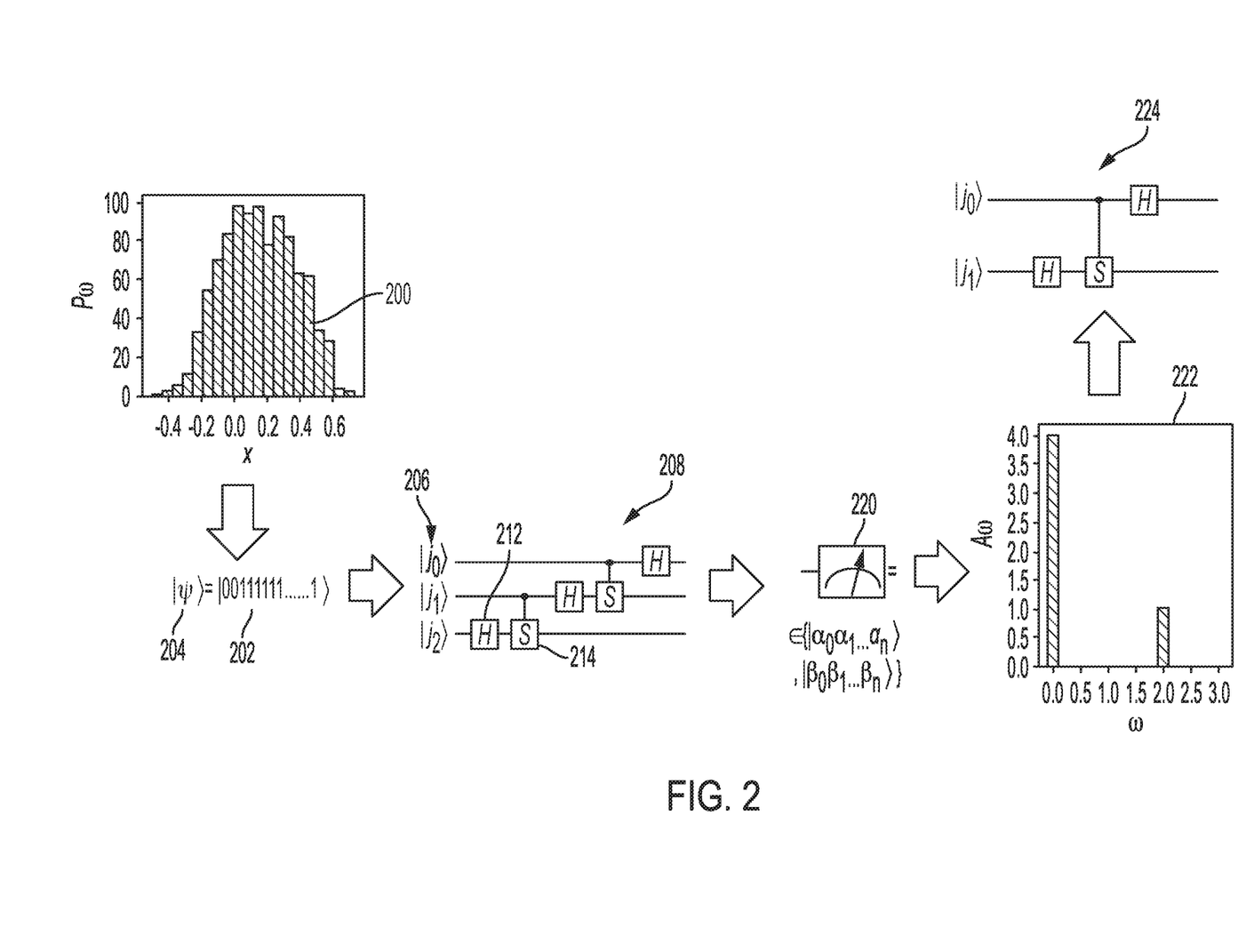
FIG. 2 further illustrates the method for performing sparse Fourier transform computation; according to an embodiment of the present invention.

FIG. 2 further illustrates the method for performing sparse quantum Fourier transform (SQFT) computation according to an embodiment of the present invention. FIG. 2 shows an example classical distribution 200 for which a frequency distribution is desired. A quantum representation 202 of the classical distribution 200 is loaded into a quantum state 204 of a quantum processor 206. The method includes defining a set of quantum circuits, each quantum circuit comprising a Hadamard gate and a single frequency rotation operator, the set of quantum circuits being equivalent to a quantum Fourier transform circuit. The method includes constructing a subset of the quantum circuits in the quantum processor 206. In the schematic illustration in FIG. 2, the subset includes at least a first circuit 208. The first circuit 208 includes a Hadamard gate 212 and a single frequency rotation operator S 214. The method includes executing the subset of the quantum circuits, for example, the first circuit 208, on the quantum state 204, and performing a measurement 220 in a frequency basis to obtain a frequency distribution 222 corresponding to the quantum state 204. According to an embodiment of the present invention, the method further includes constructing a sparse quantum Fourier transform circuit 224 based on the frequency distribution 222.

Figure 3:
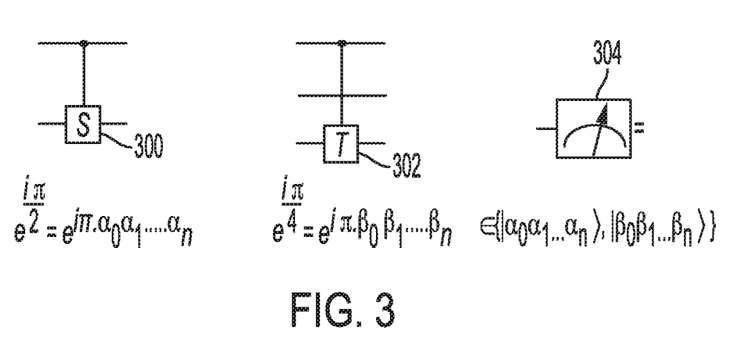
FIG. 3 is a schematic illustration of concepts related to the first frequency rotation operator S and the second frequency rotation operator T, according to an embodiment of the present invention.

The first quantum circuit 208 includes a single frequency rotation operator that is different from the single frequency rotation operator of each other quantum circuit. For example, the first circuit 208 includes a first frequency rotation operator S 214. FIG. 3 is a schematic illustration of concepts related to the first frequency rotation operator S 300, according to an embodiment of the present invention. The first frequency rotation operator S 300 is a rotation gate with a $\pi/2$ rotation angle. The first frequency rotation operator S 300 is a two-qubit rotation operator that depend on a separation between two qubits in the quantum state. For example, the first frequency rotation operator S 300 acts on adjacent qubits in the quantum state (i.e., two qubits separated by zero qubits). The subset of circuits may include additional circuits, each with a rotation operator acting on qubits separated by a fixed distance, wherein the rotation angle depends on a separation between two qubits. For example, the subset of circuits may include an additional circuit with a rotation operator that acts on pairs of qubits separated by five qubits, and the rotation angle of the operator may depend on the five-qubit separation. In this case, the quantum processor would include at least seven qubits. The embodiments of the invention are not limited to a particular number of qubits. FIG. 3 illustrates how the measurement 304 in the frequency basis provides a frequency distribution corresponding to the quantum state.

Figure 4:
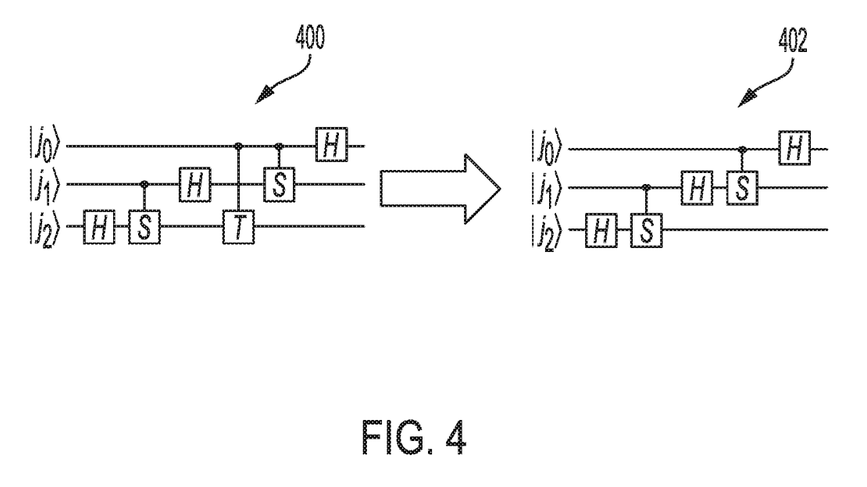
FIG. 4 is a schematic illustration of frequency localization, according to an embodiment of the invention.

FIG. 4 is a schematic illustration of frequency localization, according to an embodiment of the invention. The circuit 400 is a quantum Fourier transform circuit configured to be executed on three qubits having states $|j_0\rangle, |j_1\rangle, |j_2\rangle$. According to some embodiments, each qubit corresponds to a specific bit in all data points, simultaneously. For example, each data point's x-value may be represented by L bits and therefore L qubits are used to represent all $2^L$ data-points' y-values, in superposition.

Embodiments of the present invention include approximating the different frequencies composing the weight function. For example, FIG. 4 shows circuit 402 for approximating the frequencies. According to some embodiments, each circuit of the cascade provides an indication of a different frequency than each other circuit of the cascade upon measurement.

QFT Circuit Decimation and Interpretation: In another embodiment, QFT unitary matrix on n qubits, has entries: $F_{i,j} = \omega^{ij}$, where $$\omega = e^{\frac{2\pi i}{2^n}}$$

and i is the row index (corresponding to the output frequency) and j is the column index corresponding to the input 'time'-step variable. It can be shown that if i and j are written in binary (since they are, after all, represented with qubits) then only bit-k products of $\{i_{k_1}\}$ times $\{j_{k_2}\}$, corresponding to $k_1+k_2<n$ contribute to the matrix entry. Decimation proceeds by eliminating terms involving $k_1+k_2=n-m'<n-m$ for some approximation-order parameter m. Dropping these terms corresponds to eliminating control-rotation gates between n−m'-neighbour gates. This works as a useful approximation because the rotation angle is inversely proportional to the gap, such that large gaps correspond to small rotations, worthy targets for elimination.

In an embodiment, considering the complex plane, an alternate interpretation of this decimation scheme can be provided as follows. The slowest non-zero frequency (i=1) ω, rotates once around the plane reaching complex values $w^j$, corresponding to the $2^n$ $2^n$th-roots of unity; higher frequencies visit a subset of these complex numbers. For approximation-order parameter m, $2^m$ $2^m$-roots of unity around the complex plane can be considered and the visited complex numbers are rotated by angle $-(2\pi(2^{-m}+2^{-n}))/2$. This centers the visited complex numbers around the closest $2^m$ root of lesser complex angle.

For each of the visited complex numbers, the complex angle is replaced with the closest $2^m$th root. This is similar to complex rounding which is equivalent to rounding on the one-dimensional unit circle, thereby selecting the closest root by distance on the unit circle, or equivalently selecting the root with the largest positive overlap and normalizing. Without rotation this is equivalent to flooring to the closest root of lesser angle. The new rounded complex numbers still 'rotate' around the circle with the same frequency as before but now with jumps between and pauses at the $2^m$ roots, introducing frequency artefacts.

After the complex rounding step, the new complex numbers are rotated back by $-(2\pi(2^{-m}+2^{-n}))/2$. This ensures that the real and complex parts of the generated approximation basis states are closer to the full basis states. However, the magnitude of a given frequency is unaffected.

Use of Approximate Quantum Fourier Transform (AQFT) for Narrow-Band Signals: In an embodiment, the AQFT is used to determine the full QFT of a strong narrow-band signal (high amplitude across the band, and width less than half the range. In a case of a narrow-band signal, the first goal is to find the location of the most significant bit of the highest frequency. To do so, an AQFT can be performed on the most significant bit for a cost of $O(1)$. For example, this 'search' can be implemented in parallel and corresponds to an AQFT with $m=1$ (which is simply a tensored Hadarmard). As long as the signal is strong across the narrow-band (i.e., a strong narrow-band signal), frequency artefacts do not alter the locations of the peaks. With the discovery of the most significant bit (for example at k), the next step is to multiply the input signal by $\omega^{-2^{k_j}}$. In an embodiment, it is assumed that we have multiple copies of the input. This can be achieved by constructing a diagonal unitary $D=R_z^{2^n-1} \otimes R_z^{2^{n-2}} \ldots \otimes R_z$, where $$R_z = \begin{pmatrix} 1 & 0 \\ 0 & \omega^{-2^k} \end{pmatrix}.$$

This is achieved at cost $O(1)$.

This multiplication in the time domain corresponds to a translation in the Fourier domain, such that the frequency corresponding to angle $\omega^{2^k}$ is now positioned at zero. The highest frequency can have bits at k−1 and lower while the lowest frequency can have at most a k most-significant bit (if, for example, it was previously at zero).

In an embodiment, this procedure can be repeated (a maximum of 2k) times for a total cost of $O(k)$. This reads out the location of the highest and lowest frequencies perfectly but not their associated amplitudes. Finally, a translation on the original signal can be performed such that a midpoint frequency is at zero. Hence, an accurate QFT can now be performed on significantly fewer bits, the number of bits being dictated by the position of the most-significant bit. The cost of the full QFT is upper-bounded by $O(k^2)$ or $O(k)$.

Use of AQFT for Sparse Signals: In yet another embodiment, for c-sparse signals (c being the number of frequencies present, with the most significant bit still at k), the same scheme of finding the largest and lowest frequencies can also be employed. Once the largest and lowest frequencies are found, at a cost of $O(k)$, a quicker technique may be employed than a reduced full QFT. The respective amplitudes of the extreme frequencies can be obtained by translating them to zero $O(1)$ and projecting onto the uniform state. In an embodiment, this can be performed by applying a Hadamard gate to each qubit (equivalent to an $m=1$ AQFT, this tensored Hadamard operator's first row is the uniform state) and collecting statistics of the zero computational basis state. Once the locations and amplitudes of the extreme frequencies are known, these known signals can be added to the original signal to remove that frequency and the process can continue (due to linearity, this can be effected without actually performing the sum). Therefore, the total cost is $O(ck)$ with no need to run a full QFT at the end. Any one run has depth $O(1)$. It is then possible to perform the frequency location identification step as one approximate AQFT $O(\log(n/p))$, followed by c translations and a constant number of projections. Overall, this can still achieve the full exact QFT of the sparse signal but now in $O(\log(n/p)c)$ which is better than the best currently known classical algorithms.

Therefore, various algorithms are provided for two scenarios. 1) The Fourier transform calculation of quantum states with amplitudes that have corresponding narrow band; and 2) The Fourier transform calculation of quantum states with amplitudes that have corresponding narrow band c-sparse frequencies. Both approaches make use of AQFT and knowledge of the structure of the frequencies to save significantly on the depth of the circuit.

Based on the classical sparse fast Fourier method which is sub-linear, a quantum analog of the method and the appropriate circuit which implements it are presented herein. The method performs in sub-linear (with respect to the Hilbert base) and provides an efficient way to perform the Fourier transformation.

Systems and methods are disclosed herein for sparse quantum Fourier transform computation. The system includes a quantum computer that interfaces with a classical computer. A classical distribution is loaded from the classical computer into a quantum state on the quantum computer. The quantum state is then processed by an ensemble of frequency measurements in a process denoted herein as frequency localization. The different frequencies composing the weight function are approximated. The approximating is performed via a cascade of circuits, where each filters a corresponding frequency. The weight of each frequency is obtained by measuring in the frequency base in a process denoted as frequency estimation. The sparse construction is ported into a classical register of the classical computer. The sparse register is used classically to construct the sparse quantum Fourier transform circuit in a process denoted as transformation construction based on estimates.

Figure 5:
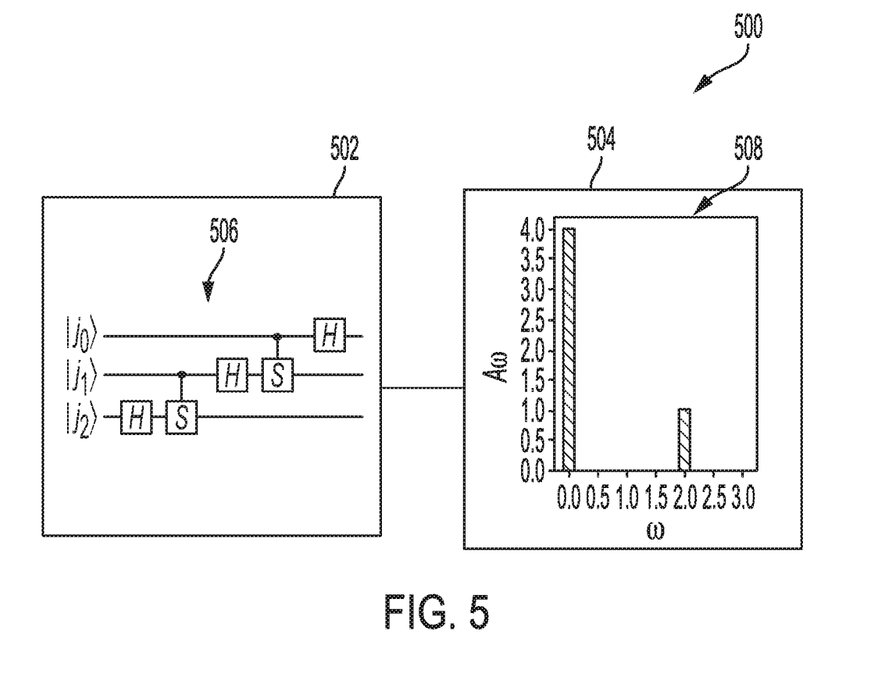
FIG. 5 is a schematic illustration of a system for sparse Fourier transform computation.

FIG. 5 is a schematic illustration of a system 500 for sparse Fourier transform computation. The system includes a quantum processor 502 and a classical computer 504. The classical computer 504 is configured to define a set of quantum circuits, each quantum circuit comprising a Hadamard gate and a single frequency rotation operator, the set of quantum circuits being equivalent to a quantum Fourier transform circuit. The classical computer 504 is configured to construct a subset 506 of the quantum circuits in the quantum processor 502, the quantum processor having a quantum representation of a classical distribution loaded into a quantum state of the quantum processor 502. The classical computer 504 is configured to receive from the quantum processor 502 a frequency distribution 508 corresponding to the quantum state.

According to some embodiments of the present invention, the classical computer 504 is further configured to construct a sparse quantum Fourier transform circuit based on the frequency distribution 508. According to some embodiments, the single frequency rotation operator is a two-qubit rotation operator that depends on a separation between two qubits in the quantum state. According to some embodiments, each quantum circuit of the set of quantum circuits comprises a single frequency rotation operator that is different from the single frequency rotation operator of each other quantum circuit. According to some embodiments, each quantum circuit of the subset 506 of the quantum circuits provides an indication of a different frequency than each other quantum circuit of the subset of the quantum circuits upon measurement. According to some embodiments, the classical computer 504 is further configured to load the quantum representation of the classical distribution into the quantum state of the quantum processor 502.

Another embodiment of the current invention is directed to a computer-readable medium comprising computer-executable code which when read by a computer causes the computer to load a quantum representation of a classical distribution into a quantum state of a quantum processor. The computer-executable code further causes the computer to define a set of quantum circuits, each quantum circuit comprising a Hadamard gate and a single frequency rotation operator, the set of quantum circuits being equivalent to a quantum Fourier transform circuit. The computer-executable code further causes the computer to construct a subset of the quantum circuits in the quantum processor, the quantum processor having a quantum representation of a classical distribution loaded into a quantum state of the quantum processor. The computer-executable code further causes the computer to receive from the quantum processor a frequency distribution corresponding to the quantum state.

According to some embodiments, the computer-executable code when read by the computer further causes the computer to construct a sparse quantum Fourier transform circuit based on the frequency distribution. According to some embodiments, the single frequency rotation operator is a two-qubit rotation operator that depends on a separation between two qubits in the quantum state. According to some embodiments, each quantum circuit of the set of quantum circuits comprises a single frequency rotation operator that is different from the single frequency rotation operator of each other quantum circuit. According to some embodiments, each quantum circuit of the subset of the quantum circuits provides an indication of a different frequency than each other quantum circuit of the subset of the quantum circuits upon measurement. According to some embodiments, the computer-executable code when read by the computer further causes the computer to load a quantum representation of a classical distribution into a quantum state of a quantum processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for performing sparse quantum Fourier transform computation, comprising:
   defining a set of quantum circuits, each quantum circuit comprising a Hadamard gate and a single frequency rotation operator, said set of quantum circuits being equivalent to a quantum Fourier transform circuit;
   constructing a subset of said quantum circuits in a quantum processor, said quantum processor having a quantum representation of a classical distribution loaded into a quantum state of said quantum processor;
   executing said subset of said quantum circuits on said quantum state; and
   performing a measurement in a frequency basis to obtain a frequency distribution corresponding to said quantum state.

2. The method according to claim 1, further comprising constructing a sparse quantum Fourier transform circuit based on said frequency distribution.

3. The method according to claim 2, wherein said classical distribution is a sparse distribution, and wherein said sparse quantum Fourier transform circuit is equivalent to said quantum Fourier transform circuit for said sparse distribution, said sparse quantum Fourier transform circuit comprising fewer gates than said quantum Fourier transform circuit.

4. The method according to claim 1, wherein said single frequency rotation operator is a two-qubit rotation operator that depends on a separation between two qubits in said quantum state.

5. The method according to claim 1, wherein each quantum circuit of said set of quantum circuits comprises a single frequency rotation operator that is different from said single frequency rotation operator of each other quantum circuit.

6. The method according to claim 1, wherein each quantum circuit of said subset of said quantum circuits provides an indication of a different frequency than each other quantum circuit of said subset of said quantum circuits upon measurement.

7. The method according to claim 1, further comprising:
   loading said quantum representation of said classical distribution into said quantum state of said quantum processor.

8. The method according to claim 1, further comprising:
   reading amplitudes of sparse frequencies in said frequency distribution by performing a frequency translation using a complex multiplication using the quantum processor.

9. A system for sparse Fourier transform computation, comprising:
   a quantum processor; and
   a classical computer configured to:
     define a set of quantum circuits, each quantum circuit comprising a Hadamard gate and a single frequency rotation operator, said set of quantum circuits being equivalent to a quantum Fourier transform circuit;
     construct a subset of said quantum circuits in said quantum processor, said quantum processor having a quantum representation of a classical distribution loaded into a quantum state of said quantum processor; and
     receive from said quantum processor a frequency distribution corresponding to said quantum state.

10. The system for sparse Fourier transform computation according to claim 9, wherein said classical computer is further configured to construct a sparse quantum Fourier transform circuit based on said frequency distribution.

11. The system for sparse Fourier transform computation according to claim 10, wherein said classical distribution is a sparse distribution, and wherein said sparse quantum Fourier transform circuit is equivalent to said quantum Fourier transform circuit for said sparse distribution but comprises fewer gates than said quantum Fourier transform circuit.

12. The system for sparse Fourier transform computation according to claim 9, wherein said single frequency rotation operator is a two-qubit rotation operator that depends on a separation between two qubits in said quantum state.

13. The system for sparse Fourier transform computation according to claim 9, wherein each quantum circuit of said set of quantum circuits comprises a single frequency rotation operator that is different from said single frequency rotation operator of each other quantum circuit.

14. The system for sparse Fourier transform computation according to claim 9, wherein each quantum circuit of said subset of said quantum circuits provides an indication of a different frequency than each other quantum circuit of said subset of said quantum circuits upon measurement.

15. The system for sparse Fourier transform computation according to claim 9, wherein said classical computer is further configured to:
load said quantum representation of said classical distribution into said quantum state of said quantum processor.

16. A non-transitory computer-readable medium comprising computer-executable code which when read by a computer causes the computer to:
define a set of quantum circuits, each quantum circuit comprising a Hadamard gate and a single frequency rotation operator, said set of quantum circuits being equivalent to a quantum Fourier transform circuit;
construct a subset of said quantum circuits in said quantum processor, said quantum processor having a quantum representation of a classical distribution loaded into a quantum state of said quantum processor; and
receive from said quantum processor a frequency distribution corresponding to said quantum state.

17. The non-transitory computer-readable medium comprising computer-executable code according to claim 16, wherein said computer-executable code when read by said computer further causes said computer to construct a sparse quantum Fourier transform circuit based on said frequency distribution.

18. The non-transitory computer-readable medium comprising computer-executable code according to claim 16, wherein said single frequency rotation operator is a two-qubit rotation operator that depends on a separation between two qubits in said quantum state.

19. The non-transitory computer-readable medium comprising computer-executable code according to claim 16, wherein each quantum circuit of said set of quantum circuits comprises a single frequency rotation operator that is different from said single frequency rotation operator of each other quantum circuit.

20. The non-transitory computer-readable medium comprising computer-executable code according to claim 16, wherein each quantum circuit of said subset of said quantum circuits provides an indication of a different frequency than each other quantum circuit of said subset of said quantum circuits upon measurement.

* * * * *